United States Patent
Tsutsui et al.

[19]

[11] Patent Number: 5,911,646
[45] Date of Patent: Jun. 15, 1999

[54] CONTROL APPARATUS FOR AUTOMATIC TRANSMISSION

[75] Inventors: Hiroshi Tsutsui, Nishio; Kazumasa Tsukamoto, Toyota; Masahiro Hayabuchi; Masaaki Nishida, both of Anjo; Yoshihisa Yamamoto; Akitomo Suzuki, both of Nishio, all of Japan

[73] Assignee: Aisin Aw Co., Ltd., Japan

[21] Appl. No.: 08/774,529

[22] Filed: Dec. 30, 1996

[30] Foreign Application Priority Data

Dec. 28, 1995 [JP] Japan .................................. 7-343776

[51] Int. Cl.$^6$ .................................................. B60K 41/26
[52] U.S. Cl. ........................... 477/93; 477/114; 192/4 A; 192/13 A
[58] Field of Search .............................. 477/92, 93, 114, 477/170, 171, 172; 192/4 A, 13 A

[56] References Cited

U.S. PATENT DOCUMENTS

| | | |
|---|---|---|
| 3,946,760 | 3/1976 | Murakami et al. ........................ 138/31 |
| 4,648,289 | 3/1987 | Kubo et al. ................................ 477/93 |
| 4,879,925 | 11/1989 | Toga et al. .................................. 192/7 |
| 5,052,531 | 10/1991 | Bota ........................................ 477/92 |
| 5,097,724 | 3/1992 | Braun ..................................... 192/4 A |
| 5,172,797 | 12/1992 | Stout et al. ........................... 192/13 R |
| 5,589,954 | 12/1996 | Iwata et al. ............................... 477/93 |
| 5,630,772 | 5/1997 | Tsukamoto et al. ...................... 477/93 |

FOREIGN PATENT DOCUMENTS

| | | |
|---|---|---|
| 0681123 | 11/1995 | European Pat. Off. . |
| 2147066 | 1/1985 | United Kingdom . |

OTHER PUBLICATIONS

Patent Abstracts of Japan, vol. 18, No. 231, Apr. 1994 Publication #JP 6024258, dated Feb. 1994.

Patent Abstracts of Japan, vol. 11, No. 348, Nov. 1997 Publication #JP 62128837, dated Jun. 1997.

*Primary Examiner*—Charles A Marmor
*Assistant Examiner*—Sherry Lynn Estremsky
*Attorney, Agent, or Firm*—Lorusso & Loud

[57] ABSTRACT

When a vehicle is halted with the transmission in a forward drive range, an input clutch is disengaged to enhance the fuel efficiency and, at the same times a hill-hold brake is engaged to prevent the vehicle from rolling backward on a steep up-slope. At that time, the hydraulic pressure $P_{C-1}$ of the input clutch C1 is gradually reduced by $\Delta P_{CIR}$ ($P_{C-1}=P_{C-1}-\Delta P_{CIR}$) while the hydraulic pressure $P_{B-1}$ of the hill-hold brake B1 is increased gradually so as to satisfy an equation $P_{B-1}=K1+K2 \cdot e$ where $\Delta P_{cir}$ is a change in hydraulic pressure which is required for gradually disengaging the first clutch C1, K1 is a hill-hold brake pressure at which braking resistance begins, K2 is hill-hold brake pressure producing a fully braked condition, and e is the input/output rotational-speed ratio of a torque converter Subsequently during start of vehicle movement, the hydraulic pressure $P_{C-1}$ of the input clutch C1 is gradually increased ($P_{C-1}=p_{C-1}+\Delta P_{C-1A}$) while the hydraulic pressure $P_{B-1}$ of the hill-hold brake B1 is gradually decreased ($P_{B-1}==P_{B-1-\Delta PB-1}$) until the ratio of the rotational speed $N_{C-1}$ of the first clutch C1 becomes less than a rotational speed $N_{C-1E}$ corresponding to the clutch being almost engaged $\Delta P_{C-1A}$ and $\Delta P_{B-1}$ are incremental values proportional to accelerator depression so that a delay in starting is reduced in accordance with driver demand.

11 Claims, 10 Drawing Sheets

|      | C1 | C2 | C3 | B1 | B2 | B3 | B4 | B5 | F1 | F2 |
|------|----|----|----|----|----|----|----|----|----|----|
| 1ST  | ○  |    |    |    |    | ◌  |    | ○  |    | ○  |
| 2ND  | ○  |    |    | ◌  | ○  |    |    | ○  | ○  |    |
| 3RD  | ○  |    |    | ◌  | ○  |    | ○  |    | ○  |    |
| 4TH  | ○  |    | ○  | ◌  | ○  |    |    |    | ○  |    |
| 5TH  | ○  | ○  | ○  |    |    |    |    |    |    |    |
| 3RD Low | ○ | ○ |    |    | ○  |    |    | ○  |    |    |
| 4TH Low | ○ | ○ |    |    | ○  |    | ○  |    |    |    |
| REV  |    | ○  |    |    |    | ○  |    | ○  |    |    |

◌ DURING ENGINE BRAKING

FIG. 2

CONTROL APPARATUS FOR AUTOMATIC TRANSMISSION

BACKGROUND OF THE INVENTION

1. Field of the Invention

The present invention relates to a control apparatus for an automatic transmission for a vehicle. More specifically, it relates to a control for starting and stopping an automatic transmission that allows hill-hold control to be carried out along with neutral control.

2. Description of Background Art

According to conventionally proposed controls of an automatic transmission of a vehicle as disclosed in Japanese Patent Application Laid-open No. Sho 63-106449, an input clutch is disengaged to enhance fuel efficiency and a hill-hold brake is engaged at the same time to prevent the vehicle from backward movement on a steep slope when the vehicle is halted in the first drive range thereof. The control method for disengaging the input clutch will be referred to hereafter as "neutral control" and the control method for engaging the hill-hold brake will be referred to hereafter as "hill-hold control". The input clutch in the automatic transmission is disengaged and engaged gradually to reduce disengagement and engagement shocks.

However, the hill-hold brake in the prior art control apparatus of the vehicle as described above is disengaged and engaged abruptly in comparison with the input clutch, which causes a disengagement shock and an abrupt change in resisting force serving to prevent the vehicle from rolling backward.

When the driver releases the foot brake and then depresses the accelerator pedal to start the vehicle in a neutral-control state on a steep slope, for example, the input clutch is engaged gradually but the hill-hold brake is disengaged abruptly. At that time, if the hill-hold brake is disengaged abruptly after substantial engagement of the input clutch, a 2-to-1 shock (that is, a disengagement shock) is produced. This is caused by the hill-hold brake also serving as a transmission brake for achieving a state of a second ratio and the hill-hold brake temporarily creating the state of the second ratio and then switching to a state of a first ratio. If the hill-hold brake is disengaged abruptly before substantial engagement of the input clutch, on the other hand, the braking force preventing backward movement of the vehicle is abruptly removed before engine torque is transmitted through the clutch to urge the vehicle forward. The absence of both a creep force generated by the engagement of the input clutch and a hill-hold force generated by the hill-hold brake allows the vehicle to roll backward under the force of gravity.

It should be noted that the neutral and hill-hold controls are carried out only when the vehicle is halted or the speed thereof is close to zero, not when the vehicle is running at a normal speed.

The disengagement shock or the backward movement due to an abrupt change in resisting force serving to prevent the vehicle from rolling backward produced during the prior art neutral and hill-hold controls are more noticeable to the driver than any shock or change in force caused during the normal running state of the vehicle. This brings a sense of uneasiness to the driver and could cause accidental collision with a car to the rear.

SUMMARY OF THE INVENTION

It is thus an object of the present invention to provide a control apparatus of an automatic transmission capable of eliminating disengagement shock and abrupt changes in resisting force serving to prevent the vehicle from rolling backward while a hill-hold brake is being disengaged.

According to the present invention, neutral control is carried out to disengage an input clutch provided between a transmission mechanism unit and an engine when a vehicle in a forward drive range is halted and a hill-hold brake is engaged at the same time to prevent the disengagement of the input clutch from causing an output shaft to rotate in a reverse direction. The neutral control apparatus gradually changes the engaging force of the input clutch in a slip region thereof while simultaneously gradually changing the engaging force of the hill-hold brake in a direction opposite to the direction in which the engaging force of the input clutch is changed.

Since the engagement and disengagement of the input clutch and the hill-hold brake are brought about by gradual changes in engaging forces, there is no significant change in the resisting force serving to prevent a vehicle from rolling backward and transmission shock is avoided. Thus, the driver does not feel a sense of uneasiness.

According to further aspect of the present invention, the engaging force of the hill-hold brake is changed in accordance with an input/output rotational-speed ratio of a torque converter which is obtained as the engaging force of the input clutch is changed. Since the input/output rotational-speed ratio (or the speed ratio) of a torque converter is accurately proportional to the engaging force of an input clutch, the engaging force of the input clutch can be easily and accurately detected merely by detecting the speed ratio. The engaging force of the hill-hold brake can also be found easily and accurately from the engaging force of the input clutch, which makes it possible to establish a relationship between the gradual increase and decrease of the respective engaging forces easily and accurately.

According to a still further aspect of the present invention, the rate of change in engaging force of the input clutch and the rate of change in engaging force of the hill-hold brake are set in accordance with a throttle opening. This makes the neutral control responsive to the driver depression of the accelerator pedal. To be more specific, the driver steps on the accelerator pedal at the end of the neutral control in most cases, which causes the rotation of the engine to increase. If a hydraulic pressure is changed after the increase in engine rotation has been detected, the input clutch will be engaged with a delay. That is, the engagement of the input clutch lags behind an increase in the engine output, which results in an engagement shock. In order to prevent such an engagement shock, the rate of change in input-clutch engaging force and the rate of change in hill-hold-brake engaging force are set in advance and in accordance with a throttle opening. In this way, it becomes possible to avoid any delay in engagement of the input clutch after an increase in engine output has been detected. Thus, a desirable relation can be established between the gradual increase and decrease of the respective forces.

According to yet another aspect of the present invention, the vehicle is started by gradually increasing the engaging force of the input clutch and gradually decreasing the engaging force of the hill-hold brake in synchronism over a time period until the input clutch is completely engaged and the engaging force of the hill-hold brake becomes zero. Since the timing with which the engaging force of the hill-hold brake becomes zero is synchronized to the point of time at which the input clutch is completely engaged it is possible to eliminate the sense of uneasiness which is likely to be brought to the driver when the timing lags behind the point of time, especially when a first ratio is gradually established after any of the higher ratios has been temporarily established.

According to still yet another aspect of the present invention, a resisting force serving to prevent the vehicle from rolling backward generated by the engaging force of the hill-hold brake in a disengaged state of the input clutch is set equal to a resisting force serving to prevent the vehicle from rolling backward generated by an advancing force resulting from complete engagement of the input clutch in an idling state of the vehicle. Throughout the entire disengagement/engagement process of the input clutch, the sum of the two forces serving to prevent the vehicle from retreating generated by the engaging forces of the hill-hold brake and the input clutch is approximately equal to a resisting force serving to prevent the vehicle from retreating generated by the advancing force resulting from complete engagement of the input clutch when the vehicle is in an idling state. As a result, the driver on a steep slope feels as if the neutral control were not being carried out. Thus, the foot brake and the accelerator pedal can be operated without bringing any sense of incompatibility to the driver in comparison with the period during which the neutral control is actually not carried out.

Since the constructions as described above make it possible to gradually increase one of the creep force of the vehicle resulting from engagement of the input clutch and the resisting force serving to prevent the vehicle from retreating resulting from engagement of the hill-hold brake and gradually decrease the other, there is no significant change in the resisting force serving to prevent the vehicle from retreating

BRIEF DESCRIPTION OF THE DRAWINGS

FIG. 2 is a table listing operation of friction-engagement elements of the automatic transmission to which the present invention can be applied;

FIG. 8 (b) is a diagram showing a relation between the throttle opening and the change in hydraulic pressure of a first brake;

DETAILED DESCRIPTION OF THE PREFERRED EMBODIMENTS

A control apparatus for an automatic transmission (hereinafter called "control apparatus") in accordance with the present invention is described below in (1) mechanical construction of the automatic transmissions, (2) operation of the automatic transmission, (3) construction and operation of a hydraulic-pressure control circuit of the automatic transmissions, and (4) configuration and operation of the control apparatus of the automatic transmission.

(1) Mechanical Construction of the Automatic Transmission

Figure 1:
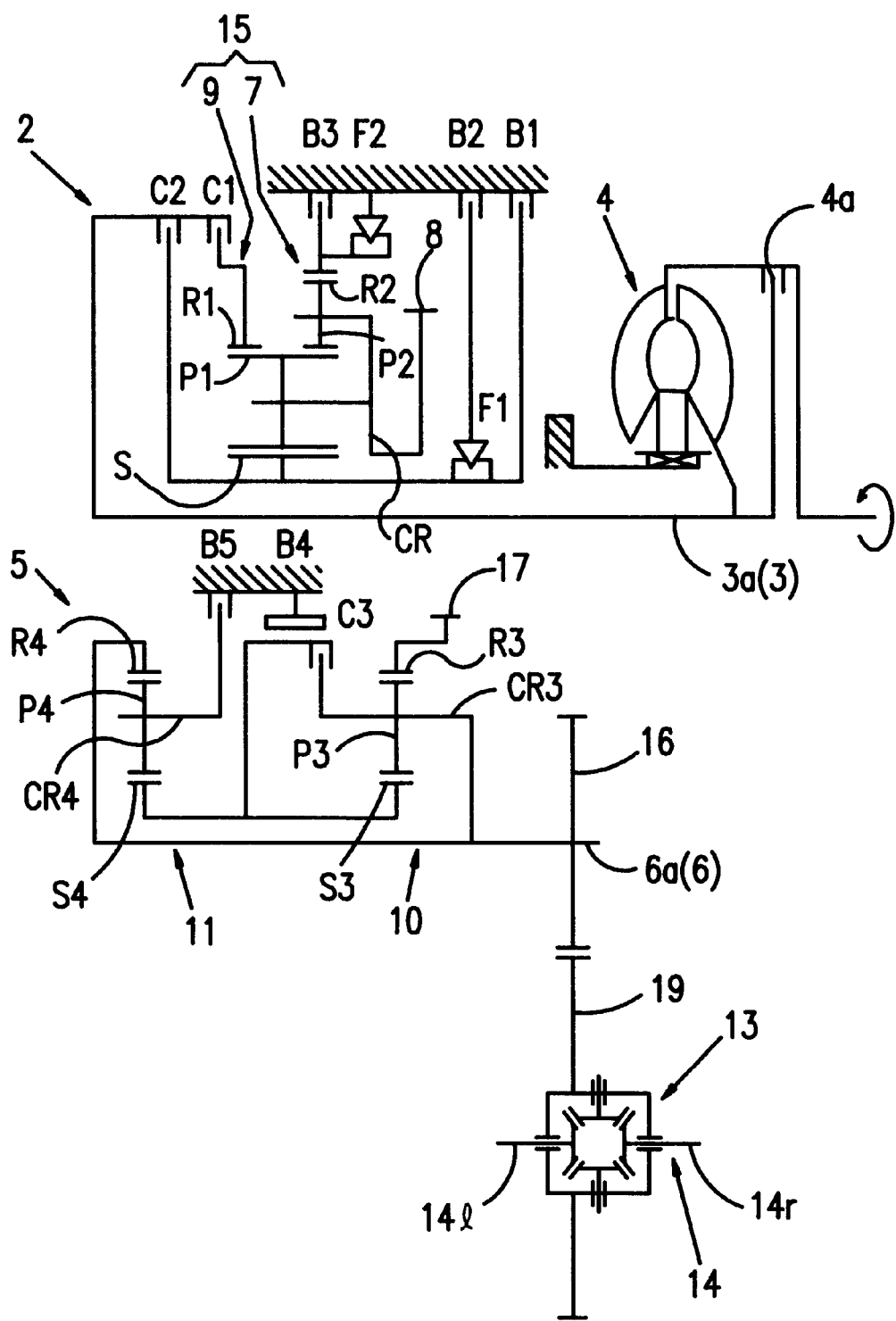
FIG. 1 is a skeleton diagram showing mechanisms of an automatic transmission to which the present invention can be applied.

FIG. 1 schematically shows a mechanical construction of an automatic transmission 1 provided with a control apparatus according to the present invention. The automatic transmission 1 as shown in FIG. 1 is a five-speed automatic transmission.

As shown in FIG. 1, the automatic transmission 1 comprises main components including a torque converter 4, a three-speed main transmission mechanism 2, a three-speed auxiliary transmission mechanism 5 and a differential unit 13 which are arranged in the direction of power transmission from an engine side at the right top of the figure to a vehicle-wheel side at the bottom of the figure. These main components are linked to each other to form a single assembled construction which is accommodated in a single case. Also provided in the single case are three shafts including a first shaft 3 actually serving as an input shaft 3a, a second shaft 6 parallel to the first shaft 3 and a third shaft which comprises a left shaft 14l and a right shaft 14r. The second shaft 6 serves as a counter shaft 6a. The first, second and third shafts 3, 6 and 14 are rotatably supported in the single-construction case. In addition, a valve body is installed outside the single-construction case.

The torque converter 4, which is provided with a lock-up clutch 4a, contains oil for transmitting power from an engine to the transmission mechanism. The torque converter 4 supplies a torque generated by the crank shaft of the engine to the main transmission mechanism 2 through flow of the oil (hydraulic connection) or mechanical connection of the lock-up clutch 4a.

The main transmission mechanism 2 has a planetary gear unit 15 which comprises a simple planetary gear 9 and a double-pinion planetary gear 7. The simple planetary gear 9 comprises a sun gear S (a long gear), a ring gear R1, a pinion P1 (a long pinion) engaged with the sun and ring gears S and R1 and a carrier CR for supporting the pinion P1. On the other hand, the double-pinion planetary gear 7 comprises the sun gear S and pinion P1 shared with the simple planetary gear 9, a ring gear R2, a pinion P2 and the carrier CR which is also shared with the simple planetary gear 9. Engaged with the sun gear S, the common carrier CR supports the pinion P1 serving as a common pinion and the pinion P2 engaged with the ring gear R2 as well as with the pinion P1.

Driven by the torque transmitted from the crank shaft of the engine through the torque converter 4, the input shaft 3a can be linked to the ring gear R1 employed in the simple planetary gear 9 of the planetary gear unit 15 with a structure described above through a first (forward or input) clutch C1 and can also be linked to the common sun gear S of the planetary gear unit 15 as well through a second (direct) clutch C2. Furthermore, the sun gear S can be directly halted by a first (hill-hold) brake B1 and can also be halted by a second brake B2 through a first one-way clutch F1.

Similarly, the ring gear R2 of the double-pinion gear 7 can be halted against reverse rotation by a third brake B3 and a second one-way clutch F2. In addition, the common carrier CR is connected to a counter drive gear 8 which serves as an output member of the main transmission mechanism 2.

The auxiliary transmission mechanism 5 comprises an output gear 16, a first simple planetary gear 10 and a second simple planetary gear 11 which are arranged one after another in the axial direction of the counter shaft 6a composing the second shaft 6 toward the rear side. In addition, the counter shaft 6a is rotatably mounted in the single-construction case through a bearing. The first and second simple planetary gears 10 and 11 are of a Simpson type, having structures described as follows.

The ring gear R3 employed in the first simple planetary gear 10 is linked to a counter driven gear 17 which is engaged with the counter drive gear 8 cited previously. A sun gear S3 employed in the first simple planetary gear 10 is rotatably supported by the counter shaft 6a. In additions a pinion P3 employed in the first simple planetary gear 10 is supported by the carrier CR3 comprising a flange which is connected to the counter shaft 6a to form a single assembled construction. In addition, the carrier CR3 holding the other end of the pinion P3 is linked to an inner hub of a UD direct clutch C3.

A sun gear S4 employed in the second planetary gear 11 is connected to the sun gear S3 of the first planetary gear 10. A ring gear R4 employed in the second planetary gear 11 is connected to the counter shaft 6a. In addition, the UD direct clutch C3 is provided between the carrier CR3 employed in the first simple planetary gear 10 on one side and the sun gears S3 and S4 which are connected to each other on the other side. The sun gears S3 and S4 can be halted by a band brake which is used as a fourth brake B4. Similarly, a carrier CR4 which supports a pinion P4 of the second planetary gear 11 can be halted by a fifth brake B5.

The brakes B1 to B5 and the one-way clutch F2 cited above are installed directly on inner surfaces of the single-construction case which surfaces are each indicated by a hatched segment in the FIG. 1.

The differential unit 13 is provided on the third shaft 14 which serves as a front wheel shafts. Having a ring gear 19 engaged with the output gear 16, the differential unit 13 distributes the rotation of the ring gear 19 to the left and right wheel shafts 14*l* and 14*r* respectively.

(2) Operation of the Automatic Transmission (Refer mainly to FIG. 2 and to FIG. 1 if necessary)

In operation of the automatic transmission 1 at a first ratio in the D (drive) range, the forward clutch Cl is engaged and the second one-way clutch F2 and the fifth brake B5 operate while the ring gear R2 employed in the double-pinion planetary gear 7 and the carrier CR4 of the second simple planetary gear 11 are held in a halted state. In this state, the rotation of the input shaft 3a is transmitted to the ring gear R1 employed in the simple planetary gear 9 through the forward clutch C1, and the ring gear R2 of the double-pinion planetary gear 7 is halted by one-way clutch F2. Thus, the common carrier CR is rotated in the positive direction at a much reduced rotational speed while the sun gear S is being rotated in the reverse direction. That is, the main transmission mechanism 2 is at a first gear ratio thereof. The rotation at the much reduced rotational speed is transmitted to the ring gear R3 employed in the first simple planetary gear 10 of the auxiliary transmission mechanism 5 through the counter drive gear 8 and the counter driven gear 17. In the auxiliary transmission mechanism 5, on the other hand, the carrier CR4 employed in the second simple planetary gear 11 is halted by the fifth brake B5, putting the auxiliary transmission mechanism 5 at a first gear ratio thereof. The rotation of the main transmission mechanism 2 at the much reduced rotational speed is further reduced by the auxiliary transmission mechanism 5 before being supplied to the output gear 16.

It should be noted that, while an engine brake is in operation, the third brake B3 is engaged.

At a second ratio, the second brake B2 operates in addition to the forward clutch C1 and, Furthermore, the operation is switched from the second one-way clutch F2 to the first one-way clutch F1. In addition, the fifth brake B5 is maintained in the operating state. In this state, the common sun gear S is halted by the second brake B2 and the first one-way clutch F1. As a result, the rotation of the ring gear R1 employed in the simple planetary gear 9, which rotation is transmitted from the input shaft 3a through the forward clutch C1, causes the carrier CR to rotate in the positive direction at a reduced rotational speed while putting the ring gear R2 of the double-pinion planetary gear 7 in a rotation state in the positive direction. Similarly, the rotation at the reduced rotational speed is forwarded to the auxiliary transmission mechanism 5 through the counter drive gear 8 and the counter driven gear 17. That is, the main transmission mechanism 2 is at a second gear ratio thereof while the auxiliary transmission mechanism 5 is at a first gear ratio thereof due to the engagement of the fifth brake B5. As a result of combining the state of the second gear ratio of the main transmission mechanism 2 with the state of the first gear ratio of the auxiliary transmission mechanism 5, the second ratio of the automatic transmission 1 as a whole is obtained.

It should be noted that, while an engine brake is in operation at the second ratio, the first (hill-hold) brake B1 is engaged. This is also true for the engine brake operating at a third or fourth ratio described hereinafter.

At a third ratio, the forward clutch C1, the second brake B2 and the first one-way clutch F1 are maintained in an engaged state as they are. However, the fifth brake B5 is disengaged while the fourth brake B4 is engaged. The main transmission mechanism 2 is maintained in the same state as it is in the second ratio. In this state, the rotation of the main transmission mechanism 2 at the second gear ratio described above is transmitted to the auxiliary transmission mechanism 5 through the counter drive gear 8 and the counter driven gear 17. In the auxiliary transmission mechanism 5, on the other hand, the rotation of the ring gear R3 employed in the first simple planetary gear 10 is output from the carrier CR3 as a rotation at a second gear ratio thereof due to the halted state of the sun gear S3. As a result of combining the state of the second gear ratio of the main transmission mechanism 2 with the state of the second gear ratio of the auxiliary transmission mechanism 5, the third ratio of the automatic transmission 1 as a whole is obtained.

At a fourth ratio, the main transmission mechanism 2 is in the same state as the second and third ratios described above wherein the forward clutch C1, the second brake B2 and the first one-way clutch F1 are engaged. In the auxiliary transmission mechanism 5, on the other hand, the fourth brake B4 is disengaged and, at the same time, the UD direct clutch C3 is engaged. With the fourth brake B4 disengaged but the UD direct clutch C3 engaged, the ring gear R3 employed in the first simple planetary gear 10 is connected to the sun gears S3 and S4 of the first and second simple planetary gears 10 and 11 respectively, putting the first and second simple planetary gears 10 and 11 in a directly-coupled rotation state wherein the first and second simple planetary gears 10 and 11 rotate integrally. As a result of combining the state of the second gear ratio of the main transmission mechanism 2 with the state of the third gear ratio (that is, the directly-coupled rotation state) of the auxiliary transmission mechanism 5, the fourth ratio of the automatic transmission 1 is obtained as a whole.

At a fifth ratio, the forward clutch C1 and the direct clutch C2 are engaged and the rotation of the input shaft 3 is transmitted to the ring gear R1 and the sun gear S employed in the simple planetary gear 9, putting the main transmission mechanism 2 in a directly-coupled rotation state wherein both the double-pinion planetary gear 7 and the simple planetary gear 9 rotate integrally. In addition, the auxiliary transmission mechanism 5 is also in a directly-coupled rotation state with the UD direct clutch C3 engaged. As a result of combining the state of the third gear ratio (that is, the directly-coupled rotation state) of the main transmission mechanism 2 with the state of the third gear ratio (that is, the directly-coupled rotation state) of the auxiliary transmission mechanism 5, the fifth ratio of the automatic transmission 1 as a whole is obtained.

Similarly, the automatic transmission 1 has intermediate ratios which operate during a down shift such as acceleration. The intermediate gear ratios are a third low ratio, a ratio between the third and second ratios denoted by the notation 3RD Low in FIG. 2, and a fourth low ratio, a ratio between the third and fourth ratios denoted by the notation 4TH Low in FIG. 2.

At the third low ratio, the forward clutch C1 and the direct clutch C2 are engaged. Actually, the second brake B2 is also engaged but the one-way clutch F1 is allowed to rotate in one direction. The main transmission mechanism 2 is in the state of the third gear ratio thereof with the planetary gear unit 15 therein directly coupled. On the other hand, the fifth brake B5 is engaged, putting the auxiliary transmission mechanism 5 at the first gear ratio thereof. As a result of combining the state of the third gear ratio of the main transmission mechanism 2 and the state of the first gear ratio of the auxiliary transmission mechanism 5, a ratio between the second and third ratios described above, that is, the third low ratio is obtained in the automatic transmission 1 as a whole.

At the fourth low ratio, the forward clutch C1 and the direct clutch C2 are engaged, causing the main transmission mechanism 2 to enter the state of the third gear ratio thereof as is the case with the third low ratio. On the other hand, the fourth brake 34 is engaged and the sun gear S3 employed in the first simple planetary gear 10 is halted, putting the auxiliary transmission mechanism 5 in a state of the second gear ratio thereof. As a result of combining the state of the third gear ratio of the main transmission mechanism 2 and the state of the second gear ratio of the auxiliary transmission mechanism 5, a ratio between the third and fourth ratios described above, that is, the fourth low ratio is obtained in the automatic transmission 1 as a whole.

It should be noted that operation in the R (reverse) range is switched in dependence upon whether the vehicle speed is greater or smaller than 7 Km/h. When the vehicle is moving forward at a speed equal to or greater than 7 Km/h, the main transmission mechanism 2 is in a free-rotation state much like the N (neutral) range When the vehicle speed is equal to or smaller than 7 Km/h, putting the vehicle virtually in a halted state, on the other hand, the direct clutch C2 and the third brake B3 are engaged and, at the same time, the fifth brake B5 is also engaged as well. In this state, the rotation of the input shaft 3a is transmitted to the sun gear S through the direct clutch C2, and the ring gear R2 employed in the double-pinion planetary gear 7 is halted by the third brake B3. As a result, while the ring gear R1 employed in the simple planetary gear 9 is rotating in the reverse direction, the carrier CR is also rotating in the reverse direction. The rotation in the reverse direction is transmitted to the auxiliary transmission mechanism 5 through the counter drive gear 8 and the counter driven gear 17. The carrier CR4 employed in the second simple planetary gear 11 is also halted in the reverse rotational direction by the fifth brake B5, maintaining the auxiliary transmission mechanism 5 in the state of the first gear ratio thereof. As a result of combining the rotation of the main transmission mechanism 2 in the reverse direction and the rotation of the auxiliary transmission mechanism 5 at the first gear ratio thereof, rotation at a reduced rotational speed in the reverse direction is output from the output shaft 16.

The control apparatus of the automatic transmission provided by the present invention is mounted in the automatic transmission 1 described above in (1) and (2). The control apparatus carries out neutral control and hill-hold control which is performed during the neutral control. More specifically, at the first ratio of the D (drive) range shown in FIG. 2, the first clutch C1 and the first brake B1 which serves as a hill-hold brake shown in FIGS. 1 and 2 are properly controlled by means of a hydraulic-pressure control circuit to be described next.

Figure 3:
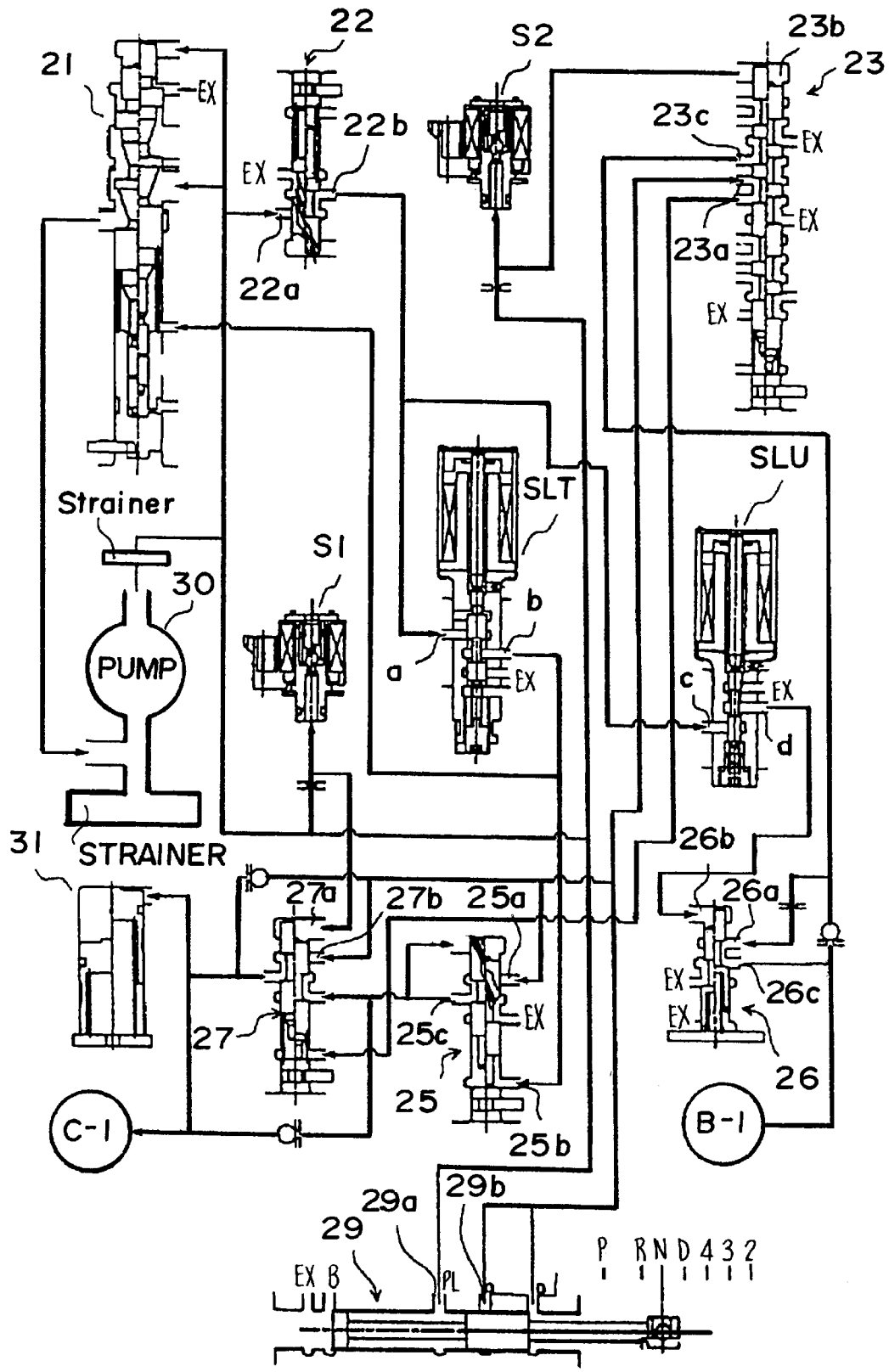
FIG. 3 is a diagram showing a hydraulic-pressure control circuit a implemented by an embodiment of the present invention.

(3) Structure and Operation of a Hydraulic-Pressure Control Circuit of the Automatic Transmission (Refer mainly to FIG. 3 and FIG. 1 when necessary)

FIG. 3 shows portions of a hydraulic-pressure control circuit used in the neutral control and the hill-hold control employed in the automatic transmission 1 according to the present invention.

Devices S1 and S2 shown in the FIG. 3 are first and second solenoid valves employed in the hydraulic-pressure control circuit and are controlled to turn on and off the neutral control and the hill-hold control. The first solenoid valve S1 is normally open while the second solenoid valve S2 is normally closed. In addition, devices SLT and SLU are linear solenoid valves which are used as a throttle valve and a lock-up valve respectively. Similarly, a primary regulator valve is denoted by 21 a solenoid modulation valve is denoted by 22 and a 1–2 shift valve and a C1 control valve are denoted by 23 and 25 respectively. A B1 control valve is denoted by 26, a neutral relay valve is denoted by 27 and a manual valve is denoted by 29.

In additions a hydraulic-pressure pump and a C1 accumulator are denoted by 30 and 31 respectively. Hydraulic pressure servos C-1 and B-1 are provided to adjust the engaging force generated by the first clutch C1 and the first brake B1 respectively.

In the hydraulic-pressure control circuit described above, the neutral control and the hill-hold control are carried out when the first solenoid valve S1 is turned on but the second solenoid valve S2 is turned off with the manual valve 29 set in the D range.

At that times hydraulic pressure generated by the hydraulic-pressure pump 30 is adjusted by the primary regulator valve 21 and supplied to various valves as a line pressure. One of the valves to which the line pressure is supplied is the neutral relay valve 27. With the first solenoid valve S1 turned on, the line pressure is supplied to a hydraulic chamber 27a of the first solenoid valve S1. In the D range in which the neutral control is carried out, the line pressure changes the neutral relay valve 27 from a position on the left-half side to a position on the right-half side. The line pressure is also supplied to the manual valve 29 as well.

The line pressure supplied to a line-pressure input port 29a of the manual valve 29 is output from an output port 29b and supplied to an input port 27b of the neutral relay valve 27, an input port 25a of the C1 control valve 25 and an input port 23a of the 1–2 shift valve 23. The line pressure supplied to the input port 27b is blocked by the neutral relay valve 27 which is set at a position on the right-half side as described above. The line pressure supplied to the input port 25a will be described later. The line pressure supplied to the input port 23a is output from an output port 23c because the 1–2 shift valve 23 is set at a position on the right-half side by another line pressure supplied from another hydraulic path to a hydraulic chamber 23b of the 1–2 shift valve 23. The hydraulic path of the other line pressure to the normally closed second solenoid valve S2 is blocked due to the fact that the second solenoid valve S2 is put in a turned-off state. A line pressure output from the output port 23c is supplied to an input port 26a of the B1 control valve 26. The line pressure supplied to the input port 26a will also be described later.

Another destination of the line pressure is the solenoid modulation valve 22. The line pressure is supplied to an input port 22a of the solenoid modulation valve 22, reduced and output from an output port 22b thereof. The reduced line pressure is supplied to an input port (a) of the linear-solenoid throttle valve SLT and is output from an output port (b) thereof as a control hydraulic pressure representing the electrical conduction of the linear-solenoid throttle valve SLT. The control hydraulic pressure is supplied to a control hydraulic chamber 25b of the C1 control valve 25. The reduced hydraulic pressure is also supplied to an input port (c) of the linear-solenoid lock-up valve SLU and is output from an output port (d) thereof as a control hydraulic pressure representing the electrical conduction of the linear-solenoid lock-up valve SLU. The control hydraulic pressure is supplied to a control hydraulic chamber 26b of the B1 control valve 26.

As described above, the line pressure and the control pressure from the SLT are supplied to the input port 25a and the control hydraulic chamber 25b of the C1 control valve 25 respectively. A spool of the C1 control valve 25 is moved in accordance with the control hydraulic pressure. A hydraulic pressure regulated in accordance with the movement of the spool is output from an output port 25c and supplied to the hydraulic pressure servo C-1 through the neutral relay valve 27 set at a position on the right-half side and the C1 accumulator 31. Similarly, the line pressure and the control pressure from the SLU are supplied to the input port 26a and the control hydraulic chamber 26b of the B1 control valve 26 respectively. A spool of the B1 control valve 26 is moved in accordance with the control hydraulic pressure. A hydraulic pressure regulated in accordance with the movement of the spool is output from an output port 26c and supplied to the hydraulic pressure servo B-1.

A hydraulic pressure regulated in accordance with the electrical conduction of the linear-solenoid throttle valve SLT is supplied to the hydraulic pressure servo C-1 which, in turn, regulates the engaging force of the first clutch C1. Likewise, a hydraulic pressure regulated in accordance with the electrical conduction of the SLU is supplied to the hydraulic pressure servo B-1 which, in turn, regulates the engaging force of the first brake B1.

(4) Configuration and Operation of the Control Apparatus of the Automatic Transmission (Refer to FIGS. 4, 5, 6, 7, 8, 9 and 10)

Figure 4:
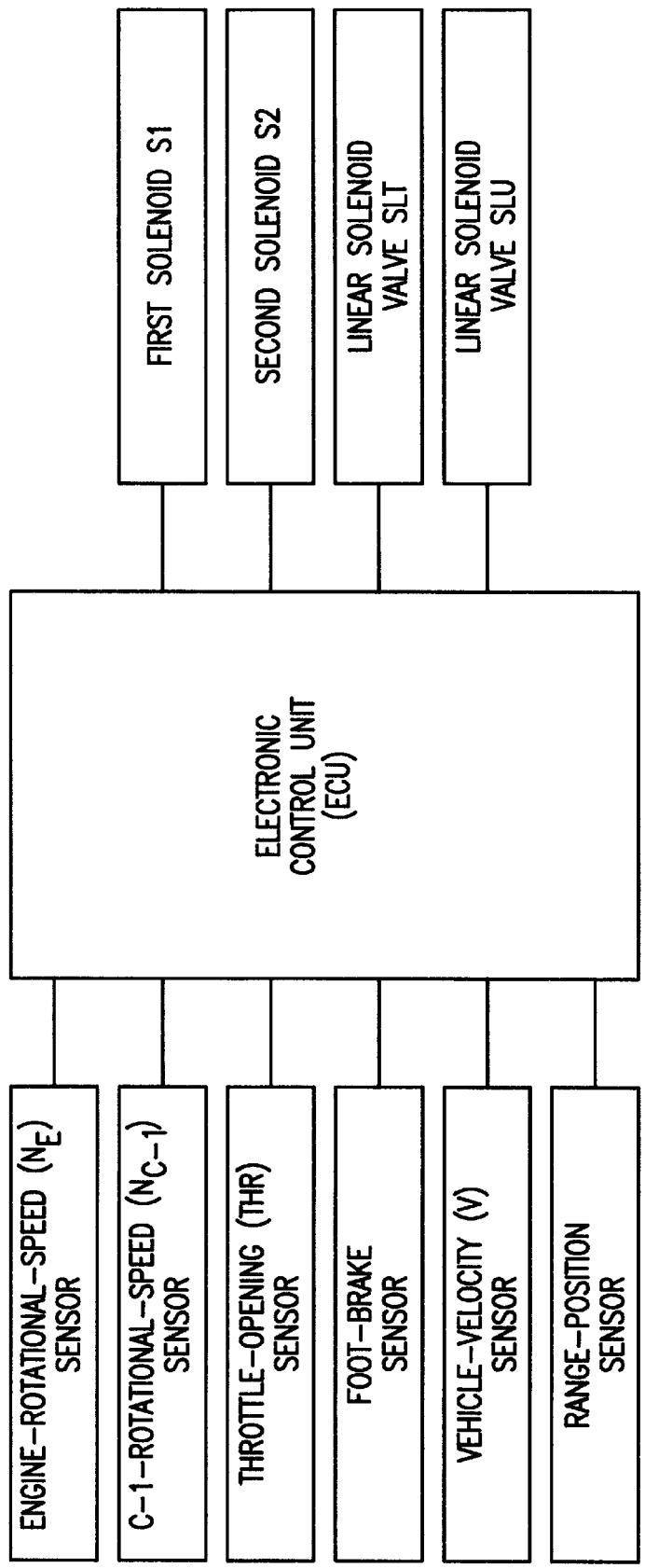
FIG. 4 is an electrical block diagram of a control for the automatic transmission in accordance with the present invention.

As shown in an electrical block diagram of FIG. 4, the control apparatus of an automatic transmission includes an electronic control unit (ECU) connected to inputs of, among other components, a sensor for detecting the rotational speed $N_E$ of the engine, a sensor for detecting the rotational speed $N_{C-1}$ of the first clutch C1, a sensor for detecting the throttle opening THR, a foot-brake sensor for detecting whether or not the foot brake is operated, a sensor for detecting the vehicle speed and a sensor for detecting the range position. The electronic control unit ECU controls the operations of the first and second solenoid valves S1 and S2 as well as the linear-solenoid valves SLT and SLU.

The neutral control and hill-hold control are carried out when a vehicle running in the D range is stopped. The procedure employed in the ECU for disengagement and control of the first clutch C1 is explained with reference to FIGS. 5 and 9.

Figure 5:
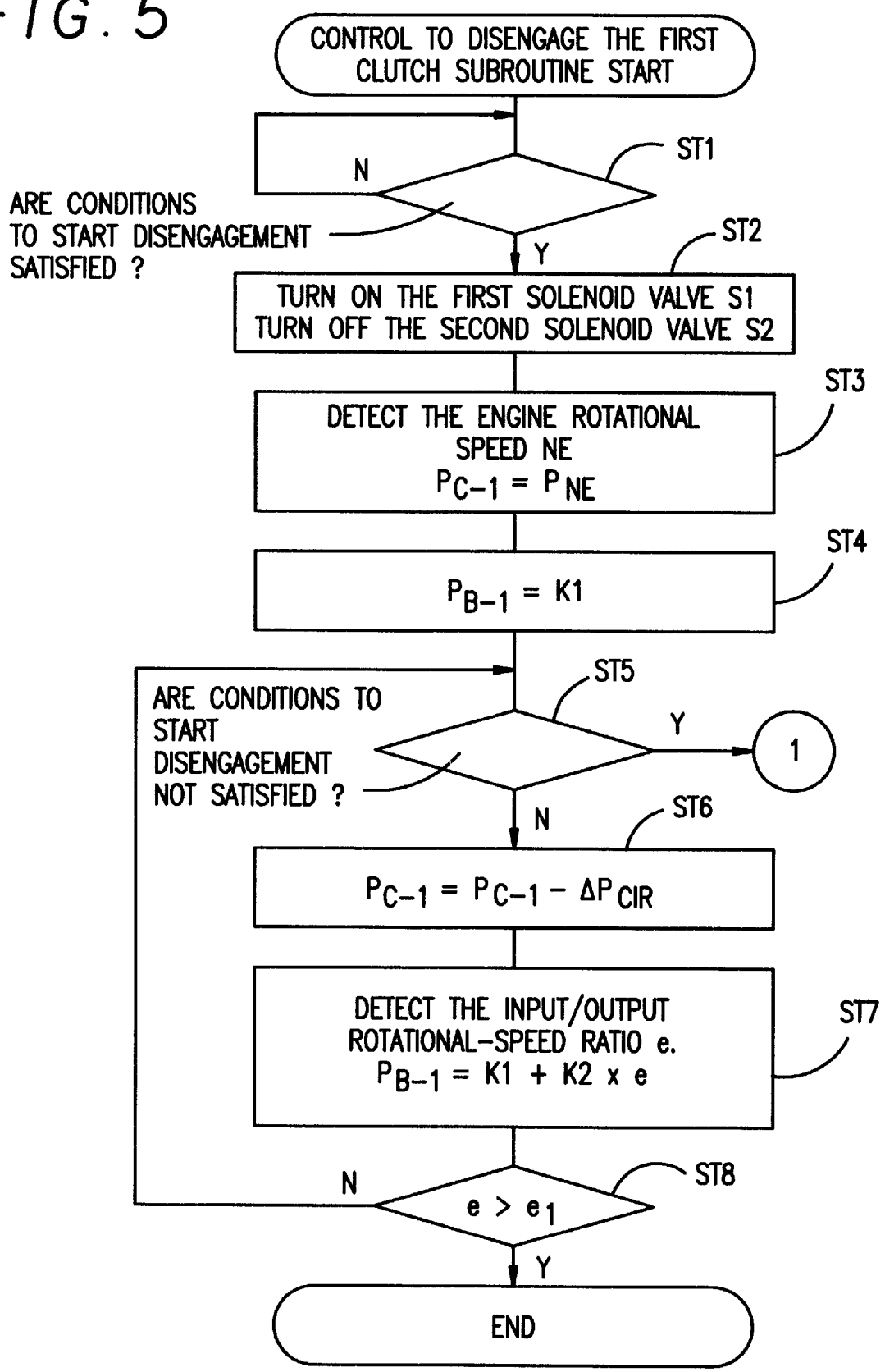
FIG. 5 is a flow chart of procedure employed in a control unit of FIG. 4 to disengage a first or input clutch.

At a step ST1 of a flow chart shown in FIG. 5, the electronic control unit ECU determines whether or not four conditions for starting disengagement of the first clutch C1 are satisfied. The four conditions are:

(1) The throttle opening THR is approximately equal to zero.

(2) The foot brake is turned on.

(3) The vehicle speed V is approximately equal to zero.

(4) The transmission is in a forward range.

Figure 9:
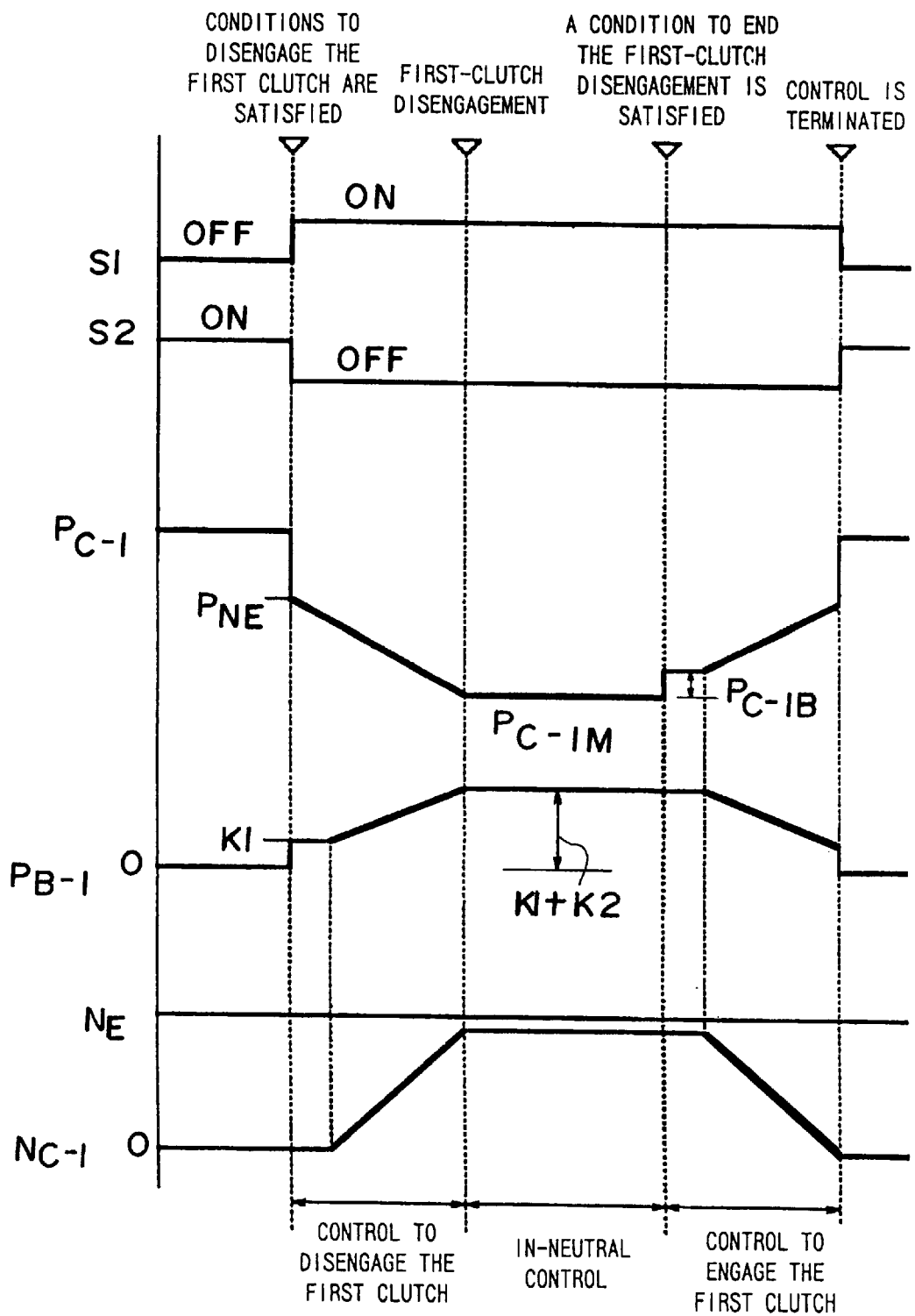
FIG. 9 is a time chart of the hydraulic pressures of a throttle valve, the first clutch and the first brake and the rotational speeds of the engine and the first clutch during neutral control.
Figure 10:
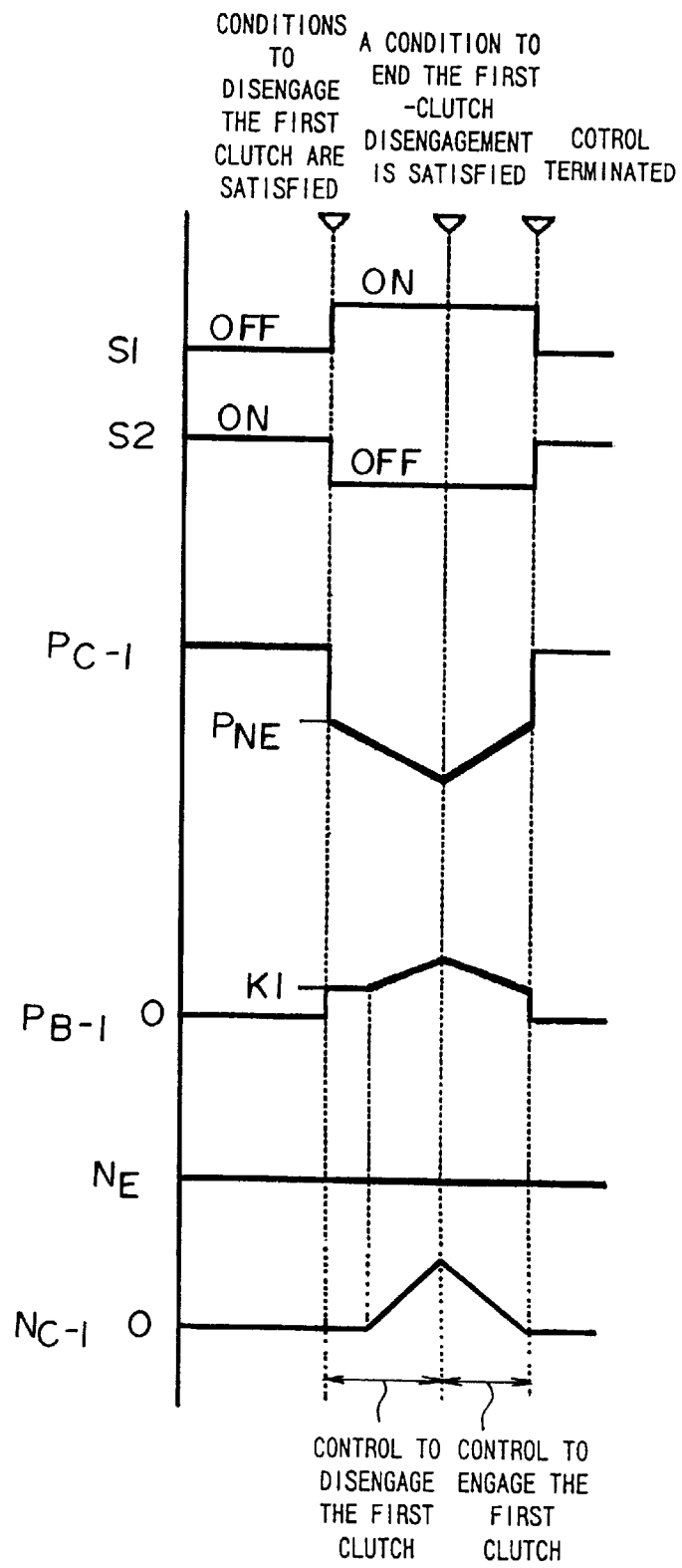
FIG. 10 is a time chart of the hydraulic pressures of a throttle valve, the first clutch and the first brake and the rotational speeds of the engine and the first clutch when a condition to terminate the disengagement control is satisfied in the course of disengagement of the first clutch.

The sensors as shown in FIG. 4 can be used for determining whether the four conditions described above are satisfied. If the four conditions are all satisfied, the procedure advances to a step ST2 to start the control to disengage the first clutch C1 by turning on the first solenoid valve S1 and turning off the second solenoid valve S2 as shown in FIG. 9. The program then proceeds to a step ST3 to operate the linear-solenoid throttle valve SLT in order to reduce the hydraulic pressure $P_{C-1}$ of the first clutch C1 till $P_{C-1}$ becomes equal to $P_{NE}$ while monitoring the rotational speed $N_E$ of the engine. $P_{NE}$ is a hydraulic pressure set in accordance with the rotational speed of the engine (that is, the input torque) and is the hydraulic clutch pressure immediately before slippage of the first clutch C1 starts. The flow then continues to a step ST4 to operate the linear-solenoid lock-up valve SLU in order to raise the hydraulic pressure $P_{B-1}$ of the first brake B1 from a current value of zero to K1 so that $P_{B-1}$ becomes equal to K1. K1 is an approximate hydraulic pressure at which the engagement of the first brake B1 is started.

The flow then proceeds to a step ST5 to again determine whether or not the four conditions for starting the disengagement of the first clutch C1 are satisfied. If any of the four conditions are not unsatisfied, that is, if all the four conditions are satisfied, the flow proceeds to a step ST6 to gradually decrease the hydraulic pressure $P_{C-1}$ of the first clutch C1 by $\Delta P_{CIR}$ ($P_{C-1}=P_{C-1}-\Delta P_{CIR}$), where $\Delta P_{CIR}$ is a change in hydraulic pressure which is required for gradually disengaging the first clutch C1. The decrease in hydraulic pressure $\Delta P_{CIR}$ determines the gradient of a line representing the hydraulic pressure $P_{C-1}$ of the first clutch C1 in a clutch-disengagement control period shown in FIG. 9. After the hydraulic pressure $P_{C-1}$ starts to decrease gradually, a slip of the first clutch C1 begins to occur to start a slip region which is closely followed by a gradual increase in $P_{B-1}$, the hydraulic pressure of the first brake B1. The procedure then continues to a step ST7 at which the hydraulic pressure $P_{B-1}$ of the first brake B1 is gradually increased while monitoring an input/output rotational speed ratio e of the torque converter by making $P_{B-1}$ equal to K1+K2×e. Here, the input/output rotational speed ratio e is a ratio of the rotational speed $N_{C-1}$ of the first clutch C1 to the rotational speed $N_E$ of the engine whereas (K1+K2) is a hydraulic pressure at which the first brake B1 is almost completely engaged, that is, a hydraulic pressure producing a brake force (resistance to roll back of the vehicle) equal to a torque converter force generated by the non-slip engagement of the first clutch C1 for advancing the vehicle. The value of the input/output rotational speed ratio e of the torque converter can be found by dividing the value of the rotational speed $N_{C-1}$ of the first clutch C1 by the value of the engine speed $N_E$. As shown in the FIG. 9, when the first clutch C1 is engaged, the value $P_{B-1}$ is zero. As the hydraulic pressure $P_{C-1}$ decreases, the value $P_{B-1}$ correspondingly increases. When the first clutch C1 is almost disengaged, the value of $N_{C-1}$ is close to that of $N_E$ or the value of e is equal to $e_1$ which is close to unity. In other words, with the input/output rotational-speed ratio e having a value close to unity, the first clutch C1 is almost disengaged and the hydraulic pressure $P_{B-1}$ of the first brake B1 reaches a maximum ($P_{B-1}$=K1+K2). It should be noted that, in the neutral control period shown in FIG. 9, a straight line representing the rotational speed $N_E$ of the engine and a straight line representing the rotational speed $N_{C-1}$ of the first clutch C1 are shown as lines which are slightly separated from each other for the sake of convenience. In actuality, however the straight lines almost coincide with each other. That is, in this in-neutral-control period, e (=$N_{C-1}/N_E$) is approximately equal to unity. Thus, $P_{B-1}$ (=K1+K2×e) is about equal to (K1+K2).

The flow then goes on to a step ST8 to determine whether or not e>e1. If e>e1, the control to disengage the first clutch C1 is completed.

If the four conditions are found not satisfied at the step ST5, on the other hand, the control apparatus transits from disengagement control to engagement control as will be described later.

As described above, during the control to disengage the first clutch C1 in the slip region thereof, since the creep force of the vehicle can be gradually decreased by gradually reducing the hydraulic pressure $P_{C-1}$ of the first clutch C1 while, at the same time, the force to resist the roll back of the vehicle can be gradually strengthened by gradually increasing the hydraulic pressure $P_{B-1}$ of the first brake B1, disengagement shock of the first clutch C1 can be avoided and, at the same time, there is no change in total magnitude of the force to resist the roll back of the vehicle, preventing the driver from feeling a sense of uneasiness or risk.

Furthermore, according to the present invention, not only are the hydraulic pressure $P_{C-1}$ of the first clutch C1 and the hydraulic pressure $P_{B-1}$ of the first brake B1 gradually decreased and increased respectively, but both hydraulic pressures $P_{C-1}$ and $P_{B-1}$ are constructively related to each other. That is, by using the input/output rotational-speed ratio e (which increases as $P_{C-1}$ increases and decreases as $P_{C-1}$ decreases) in the equation at the step ST8 for computing the hydraulic pressure $P_{B-1}$ of the first brake B1 ($P_{B-1}$=K1+ K2×e), an direct relationship is established between the gradual decrease in $P_{C-1}$ and the gradual increase in $P_{B-1}$, i.e., an inverse relationship between $P_{C-1}$ and $P_{B-1}$ maintaining a constant resistance to roll back.

Figure 7:
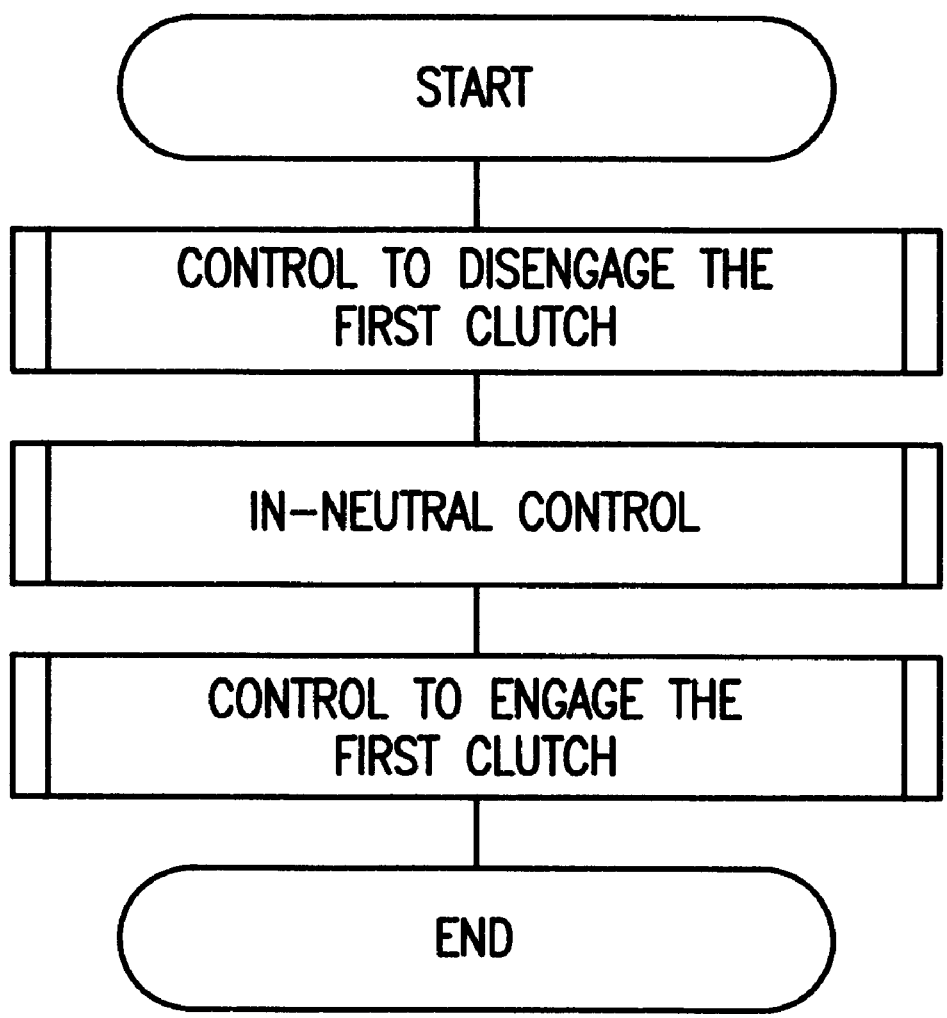
FIG. 7 shows a flow diagram of the overall neutral control of the first or input clutch.

As the control to disengage the first clutch C1 is completed, the control apparatus transits to in-neutral control as shown in FIGS. 7 and 9. In the in-neutral control, the hydraulic pressure for the hydraulic pressure servo C-1 is regulated so that, after the control to disengage the first clutch C1 has been completed, the state immediately before the engagement of the first clutch C1 is restored. During the in-neutral control, the hydraulic pressure of the first clutch C1 is $P_{C-1M}$ whereas the hydraulic pressure of the first brake B1 is K1+K2. When a condition to terminate the disengagement of the first clutch C1 is found satisfied during the in-neutral control, that is, when any one of the four conditions to start the disengagement of the first clutch C1 are found not satisfied any more, the control apparatus begins the control to engage the first clutch Cl and start vehicle movement.

The neutral control and the hill-hold control which are carried out when the vehicle is started (that is, the control to engage the first clutch C1) are explained with reference to FIGS. 6 and 9.

Figure 6:
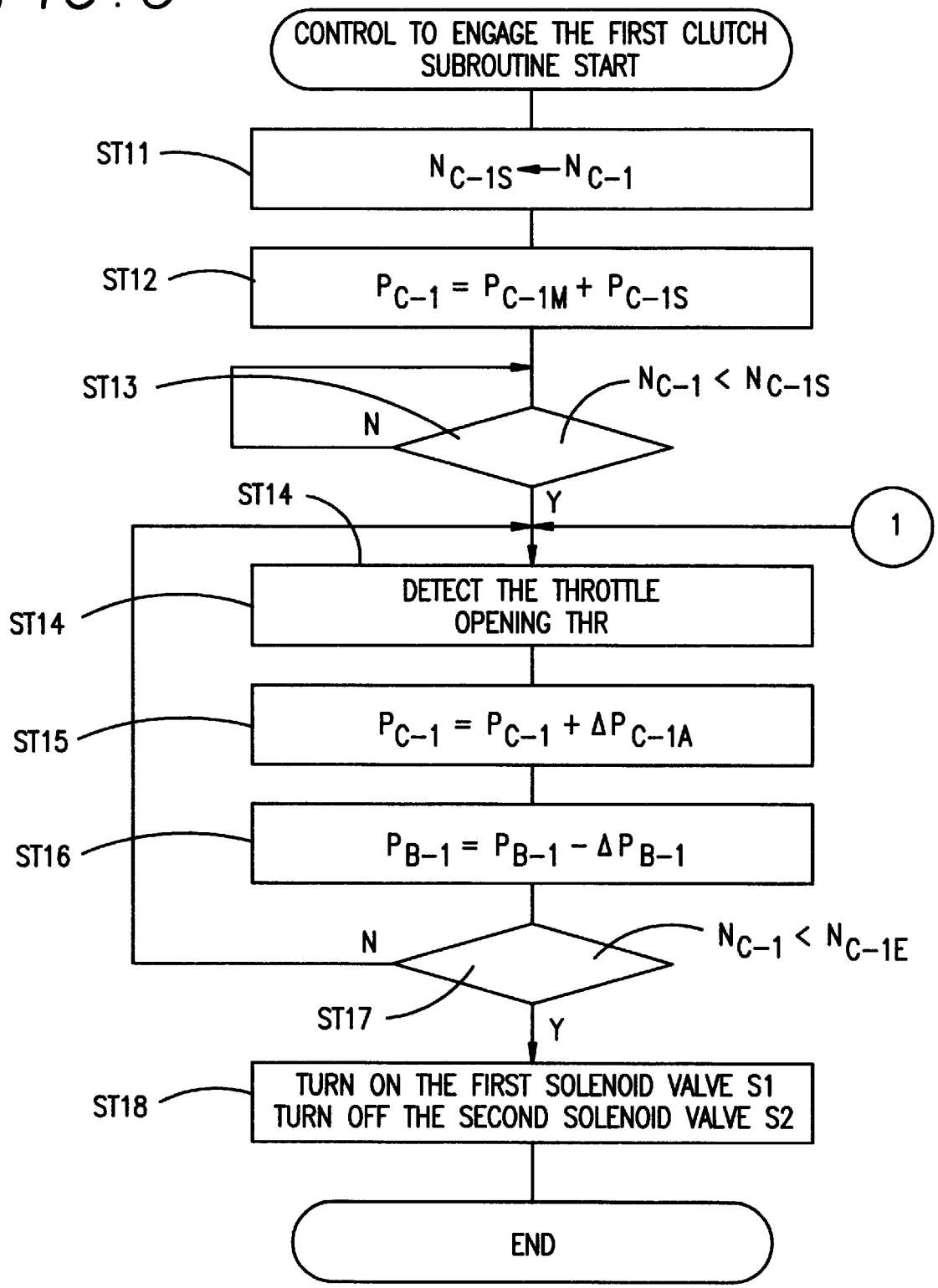
FIG. 6 is a flow chart of procedure employed in the control unit of FIG. 4 to engage the first or input clutch.
Figure 8A:
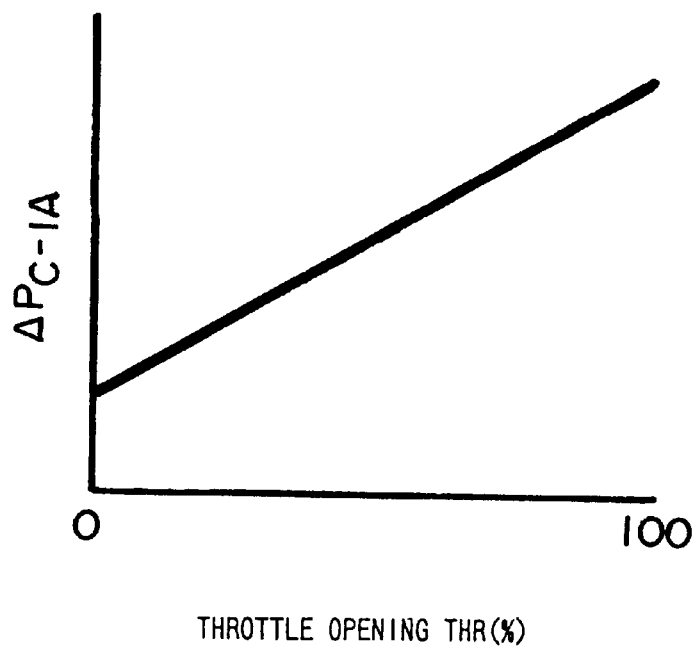
FIG. 8 (a) is a diagram showing a relation between the throttle opening and the change in hydraulic pressure of the first clutch.
Figure 8B:
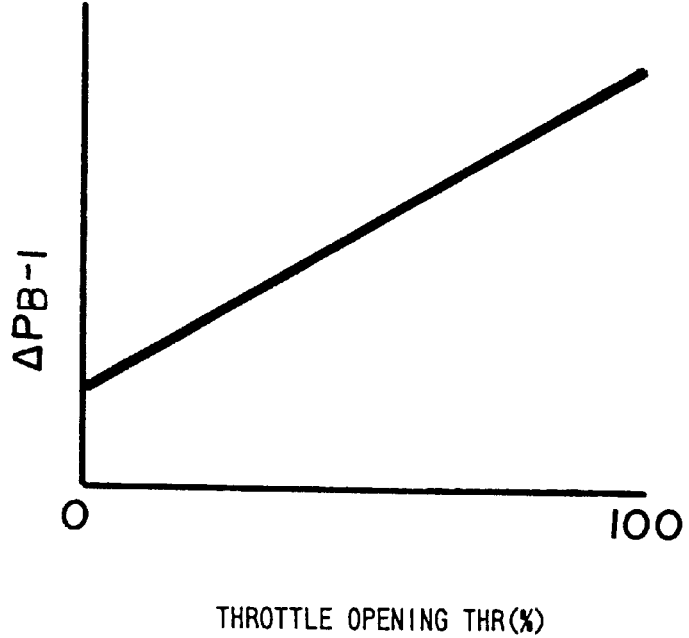

When the condition to terminate the disengagement of the first clutch C1 is satisfied, the first clutch engagement procedure begins at a step ST11 of the flow diagram shown in FIG. 6. The rotational speed $N_{C-1}$ of the first clutch C1 at the beginning of the control to engage the first clutch C1 is stored as an initial rotation $N_{C-1S}$. The procedure then goes on to a step ST12 to increase the hydraulic pressure $P_{C-1}$ of the first clutch C1 to $P_{C-1M}+P_{C-1S}$ ($P_{C-1}=P_{C-1M}+P_{C-1S}$). Here, $P_{C-1S}$ is an increase in hydraulic pressure by which the first clutch C1 attains a predetermined initial engagement state since, during the in-neutral control, the first clutch C1 has been controlled to a state immediately before the engagement state. The flow then proceeds to a step ST13 to determine whether or not the present rotational speed $N_{C-1}$ of the first clutch C1 is smaller than $N_{C-1S}$ stored at the step ST11. If $N_{C-1}$ is found smaller than $N_{C-1S}$ at the step ST13, the engagement of the first clutch C1 is judged to have been started and the procedure branches to a step ST14 to detect the throttle opening THR. The flow then proceeds to a step ST15 at which the hydraulic pressure $P_{C-1}$ of the first clutch C1 is gradually increased ($P_{C-1}=P_{C-1}+\Delta P_{C-1A}$) where $\Delta P_{C-1A}$ is a change in hydraulic pressure $P_{C-1}$ set in accordance with the throttle opening THR as shown in FIG. 8(a). The change in hydraulic pressure $\Delta P_{C-1A}$ determines the gradient of the change in $P_{C-1A}$ during the control to engage the first clutch C1. For a large amount of the depression of the throttle pedal, the change in hydraulic pressure $\Delta P_{C-1A}$ is set at a value which is large enough to engage the first clutch C1 in a short time. As a result, for a large value of the throttle opening THR, the time required to engage the first clutch C1 is short. The flow then goes on to a step ST16 at which the hydraulic pressure $P_{B-1}$ of the first brake B1 is gradually reduced ($P_{B-1}=P_{B-1}-\Delta P_{B-1}$) where $\Delta P_{B-1}$ is a change in hydraulic pressure $P_{B-1}$ set in accordance with the throttle opening THR as shown in FIG. 8(b) much like the change in hydraulic pressure $\Delta P_{C-1A}$ which determines the gradient of the change in $P_{C-1A}$ during the control to engage the first clutch C1. More specifically, if the throttle opening THR has a large value, the first clutch C1 is engaged in a short time. In this case, the change in hydraulic pressure $P_{B-1}$ is thus set at a value which is large enough to also disengage the first brake B1 in a short time as well. As a result, the change in hydraulic pressure $\Delta P_{C-1A}$ and the change in hydraulic pressure $\Delta P_{B-1}$ are set at such values that the first clutch C1 is completely engaged synchronously with the disengagement of the first brake B1. The resistance of the brake B1 becomes zero upon the disengagement of the first brake B1.

The flow then proceeds to a step ST17 at which the rotational speed $N_{C-1}$ of the first clutch C1 is compared with a rotational speed $N_{C-1E}$, the rotational speed $N_{C-1}$ which is detected when the first clutch C1 is almost engaged. If the rotational speed $N_{C-1}$ is found smaller than the rotational speed $N_{C-1E}$ ($N_{C-1}<N_{C-1E}$), the flow continues to a step ST18 at which the first solenoid valve S1 is turned off while the second solenoid valve S2 is turned on, completing the control to engage the first clutch C1.

In the control to engage the first clutch C1 described above, the hydraulic pressure $P_{C-1}$ of the first clutch C1 is gradually increased while the hydraulic pressure $P_{B-1}$, of the first brake B1 is gradually decreased. Furthermore, the rates of changes in hydraulic pressures $P_{C-1}$ and $P_{B-1}$ are set in accordance with the throttle opening THR. As a result, a disengagement shock can be effectively prevented from occurring due to the disengagement of the first brake B1, and an abrupt change in force reacting to a force causing the vehicle to roll back can also be avoided as well.

If the four conditions to start the disengagement of the first clutch C1 are found not satisfied during the disengagement control at the step ST5 shown in FIG. 5, that is, if the condition to terminate the disengagement is satisfied, the control apparatus transits from disengagement control to engagement control. This transition will be explained with reference to FIG. 10. The control apparatus terminates the control to disengage the first clutch C1, immediately transiting to control to engage the first clutch C1. That is, explaining in terms of the time charts as shown in FIG. 9, the control apparatus switches control from a point of time in the course of the control to disengage the first clutch C1 to a point of time in the course of the control to engage the first clutch C1, skipping the in-neutral control.

Effects gained from the transition from the disengagement control to the engagement control are the same as those resulting from the control to disengage or engage the first clutch C1.

What is claimed is:

1. A control apparatus for an automatic transmission comprising:
   a transmission mechanism for providing a plurality of transmission ratios for a vehicle;
   an input clutch provided between the transmission mechanism and an engine;
   a hill-hold brake for preventing rotation of an output shaft of the transmission mechanism;
   a neutral control for disengaging the input clutch and for engaging the hill-hold brake when the vehicle in a forward drive range is halted, said neutral control including gradual changing means for providing simultaneous gradual changes in disengaging and engaging forces of the input clutch and the hill-hold brake so that the engaging force of said input clutch in a slip region thereof is gradually changed while an engaging force of said hill-hold brake is gradually changed in a direction opposite to the direction in which said engaging force of said input clutch is changed to prevent transmission shock and vehicle roll-back on a hill incline;
   a torque converter; and
   means for detecting an input/output rotational-speed ratio of said torque converter, as said engaging force of said input clutch is changed, said gradual changing means changing the engaging force of said hill-hold brake in accordance with the detected input/output rotational-speed ratio.

2. A control apparatus for an automatic transmission according to claim 1 further comprising means for detecting a throttle opening; said gradual changing means having a rate of change in engaging force of said input clutch set in accordance with the detected throttle opening and having a rate of change in engaging force of said hill-hold brake set in accordance with the detected throttle opening.

3. A control apparatus for an automatic transmission according to claim 2 wherein said gradual changing means produces an engaging force of said hill-hold brake in a disengaged state of said input clutch resulting in a braking resistance to vehicle roll back equal to a creep resistance to vehicle roll back resulting from complete engagement of said input clutch in an idling state of said vehicle.

4. A control apparatus of an automatic transmission according to claim 2 wherein said gradual changing means maintains a uniform combined resisting force including (1) a braking force generated by said engaging force of said hill-hold brake and (2) an advancing force generated by engagement of said input clutch in an idling state of said vehicle so as to prevent backward movement of said vehicle during the gradual changes in the engaging and disengaging forces.

5. A control apparatus for an automatic transmission according to claim 1 wherein said gradual changing means, when said vehicle is started from a halted states synchronizes the gradual decrease of said engaging force of said hill-hold brake with the gradual increase in said engaging force of said input clutch over a time period so that said input clutch becomes completely engaged at a point of time at which said engaging force of said hill-hold brake becomes zero.

6. A control apparatus for an automatic transmission according to claim 5 wherein said gradual changing means produces an engaging force of said hill-hold brake in a disengaged state of said input clutch resulting in a braking resistance to vehicle roll back equal to a creep resistance to vehicle roll back resulting from complete engagement of said input clutch in an idling state of said vehicle.

7. A control apparatus of an automatic transmission according to claim 5 wherein said gradual changing means maintains a uniform combined resisting force including (1) a braking force generated by said engaging force of said hill-hold brake and (2) an advancing force generated by engagement of said input clutch in an idling state of said vehicle so as to prevent backward movement of said vehicle during the gradual changes in the engaging and disengaging forces.

8. A control apparatus for an automatic transmission according to claim 1 wherein said gradual changing means produces an engaging force of said hill-hold brake in a disengaged state of said input clutch resulting in a braking resistance to vehicle roll back equal to a creep resistance to vehicle roll back resulting from complete engagement of said input clutch in an idling state of said vehicle.

9. A control apparatus for an automatic transmission according to claim 1 wherein said gradual changing means produces an engaging force of said hill-hold brake in a disengaged state of said input clutch resulting in a braking resistance to vehicle roll back equal to a creep resistance to vehicle roll back resulting from complete engagement of said input clutch in an idling state of said vehicle.

10. A control apparatus of an automatic transmission according to claim 1 wherein said gradual changing means maintains a uniform combined resisting force including (1) a braking force generated by said engaging force of said hill-hold brake and (2) an advancing force generated by engagement of said input clutch in an idling state of said vehicle so as to prevent backward movement of said vehicle during the gradual changes in the engaging and disengaging forces.

11. A control apparatus of an automatic transmission according to claim 1 wherein said gradual changing means maintains a uniform combined resisting force including (1) a braking force generated by said engaging force of said hill-hold brake and (2) an advancing force generated by engagement of said input clutch in an idling state of said vehicle so as to prevent backward movement of said vehicle during the gradual changes in the engaging and disengaging forces.

* * * * *

UNITED STATES PATENT AND TRADEMARK OFFICE
CERTIFICATE OF CORRECTION

PATENT NO. : 5,911,646
DATED : June 15, 1999
INVENTOR(S) : TSUTSUI et al

It is certified that error appears in the above-identified patent and that said Letters Patent is hereby corrected as shown below:

On the title page, item [56], Under the heading "References Cited", "U.S. 5,589,954" should read --U.S. 5,586,954--.

IN THE ABSTRACT:
    Line 3, delete "times" insert --time--;
    Line 14, after "converter" insert a period --.--; and
    Line 18, "$(P_{B-1}==P_{B-1-\Delta PB-1})$" should read
--$(P_{B-1}=P_{B-1}-\Delta P_{B-1})$--.

Col. 3, line 45, "a" should read --as--.
Col. 4, line 10, "transmissions" should read --transmission--; and
    line 13, "transmissions" should read --transmission--.

UNITED STATES PATENT AND TRADEMARK OFFICE
CERTIFICATE OF CORRECTION

PATENT NO. : 5,911,646
DATED : June 15, 1999
INVENTOR(S) : TSUTSUI et al

It is certified that error appears in the above-identified patent and that said Letters Patent is hereby corrected as shown below:

Col. 5, line 19, "additions" should read --addition--;
      line 42, "shafts" should read --shaft--.
Col. 7, line 47, delete "34" and insert --B4--;
      line 61, after "range" insert a period --.--.
Col. 8, line 57, "times" should read --time--.
Col. 14, line 12, "states" should read --state--.

Signed and Sealed this

Thirty-first Day of October, 2000

Attest:

Q. TODD DICKINSON

Attesting Officer      Director of Patents and Trademarks